United States Patent
Goto et al.

(10) Patent No.: US 6,537,653 B1
(45) Date of Patent: Mar. 25, 2003

(54) LIGNEOUS FIBROUS FILLER/OLEFINIC PLASTIC COMPOSITE SHEET FOR BONDING

(75) Inventors: Fumi O Goto, Kurashiki (JP); Yasumasa Kasahara, Kurashiki (JP); Tatsuyuki Ishiura, Kurashiki (JP)

(73) Assignee: Namba Press Works Co., Ltd., Kurashiki (JP)

( * ) Notice: Subject to any disclaimer, the term of this patent is extended or adjusted under 35 U.S.C. 154(b) by 0 days.

(21) Appl. No.: 09/508,653

(22) PCT Filed: Jul. 2, 1999

(86) PCT No.: PCT/JP99/03596

§ 371 (c)(1), (2), (4) Date: Mar. 13, 2000

(87) PCT Pub. No.: WO00/04087

PCT Pub. Date: Jan. 27, 2000

(30) Foreign Application Priority Data

Jul. 17, 1998 (JP) ............................................ 10-203554

(51) Int. Cl.[7] .................................................. D21J 1/00
(52) U.S. Cl. ................................ 428/292.4; 428/294.7; 428/311.71; 428/311.91; 428/317.9; 428/322.7; 428/324; 428/340

(58) Field of Search ........................... 428/292.4, 294.7, 428/311.71, 311.91, 323, 332, 340, 317.9, 322.7, 324

(56) References Cited

FOREIGN PATENT DOCUMENTS

| EP | 0 540 026 A1 | | 5/1993 |
|---|---|---|---|
| EP | 0962488 | * | 8/1999 |
| JP | 54-68852 | | 6/1979 |
| JP | WO98/30378 | | 7/1998 |
| JP | 0 962 488 A1 | | 12/1999 |

* cited by examiner

*Primary Examiner*—Merrick Dixon
(74) *Attorney, Agent, or Firm*—Renner, Kenner, Greive, Bobak, Taylor & Weber

(57) ABSTRACT

A bondable wood cellulosic filler/olefinic plastic composite sheet material made by extruding in a sheet shape a mixture consisting of: (1) 40–60 parts by weight of an olefinic plastic; (2) 60–40 parts by weight of a wood cellulosic filler, the size thereof being 40–110 mesh and the water content being not exceeding 5%; and (3) 0.5–5.0 parts by weight of an additive mainly consisting of polypropylene modified by maleic anhydride or its derivative.

17 Claims, No Drawings

LIGNEOUS FIBROUS FILLER/OLEFINIC PLASTIC COMPOSITE SHEET FOR BONDING

TECHNICAL FIELD

The present invention relates to a composite sheet material mainly consisting of a wood cellulosic filler and an olefinic plastic and, in particular, relates to the composite sheet material bonded with a wooden part or member of an article or a surface material of a non-woven fabric of a polyester fiber, a paper, a pulp or the like.

BACKGROUND OF THE ART

A composite sheet material is broadly used for components of an automobile and mainly consists of an olefinic plastic such as polyethylene, polypropylene and the like and a wood cellulosic filler produced by crushing or pulverizing a wood or lumber, a hardboard, a pulp or the like into a predetermined size.

Such a component is made by usually laminating or integrating simultaneously together with a surface material of a non-woven fabric of a polyester fiber, a paper, a pulp or the like in an extrusion molding process of the composite sheet material.

As one technique, the composite sheet material is molded and is then heated. Then, the surface material described above is put thereon and those materials are pressed together in a mold, so that a component having a layered structure can be made. In this technique, a polyolefinic plastic film as a hot melt film must be put between those materials so as to form a sandwich structure to press and mold those materials together with the film. Otherwise, the desired bond strength (for example, the hot water resisting property) between those materials cannot be achieved. Note that the hot water resisting test is done by observing whether a relief is appeared at an end side of a bond portion or not after heating and drying it at 60° C. for 2 hours after dipping it into hot water at 70° C. for 3 hours. If the relief is not appeared, the hot water resisting property is said to be good.

In another technique, the composite sheet material described above can be adhered to the surface material or the wooden part or member by use of an adhesive. In this technique, a surface of the composite sheet material is, in advance, sanded or rubbed with a sand paper. Note that this sanding process may be carried out after the hot molding process of the composite sheet material is completed or may be carried out on the composite sheet material which has not undergone such a hot molding process.

In this technique, as well as the above technique, the desired bond strength such as the hot water resisting property can not be achieved because of influence of the inactive olefinic plastic mixed in the composite sheet material.

In order to improve the adhesive property of the composite sheet material, the surface thereof is sanded as described above. In such a technique, the amount of the wood cellulosic filler used is increased to 50%–60% to improve the adhesive property. That is, this composite sheet material contains too much amount of the wood cellulosic filler. This induces that the frictional heating produced during the sanding process softens polypropylene, and in addition to this matter, the sand paper is blinded by microscopic chips or waste produced during the sanding process. Such chips or waste are difficult to remove by means of air blowing, and as a result, the efficiency of the sanding process is considerably reduced and the sand paper must be frequently changed.

Therefore, the present invention is made to solve those problems, and an object of the present invention is to provide a bondable wood cellulosic filler/olefinic plastic composite sheet material which can be welded to a variety of surface materials and has a good bond strength without using any welding materials.

Another object of the present invention is to provide a bondable wood cellulosic filler/olefinic plastic composite sheet material which can be welded to a variety of surface materials and has a good bond strength without requiring any means of pliers and carrying out any further surface treatments.

Still another object of the present invention is to provide a bondable wood cellulosic filler/olefinic plastic composite sheet material in which a sand paper used for sanding the composite sheet material is not easily blinded and microscopic chips or waste, which are produced during the sanding process, attached to the sand paper can be easily removed by means of air blowing.

DISCLOSURE OF THE INVENTION

A bondable wood cellulosic filler/olefinic plastic composite sheet material according to the present invention is made by extruding in a sheet shape a mixture consisting of:

(1) 40–60 parts by weight of an olefinic plastic;
(2) 60–40 parts by weight of a wood cellulosic filler, the size thereof being 40–110 mesh, and the water content thereof being not exceeding 5%; and
(3) 0.5–5.0 parts by weight of an additive mainly consisting of polypropylene modified by maleic anhydride or its derivative.

Note that the additive used is preferably 1.0–3.0 parts by weight.

If the bondable composite sheet material according to the present invention is sanded or rubbed with a sand paper and is then adhered by use of an adhesive, it is desirable that the size of the wood cellulosic filler used is 40–50 mesh and mica is further added therein. The amount of mica added is 3–8 parts by weight, and the weight average flake size is 100–300 μm and its aspect ratio is 60–70. More preferably, the amount of mica added is 4–6 parts by weight, and the weight average flake size is 100–280 μm and its aspect ratio is 60–70.

The sanding process for the composite sheet material according to the present invention may be carried out by passing it through a sanding machine having #80–120 sand paper after the mixture described above is extruded in a sheet shape. Then, an adhesive (for example, melamine type or urethane modified vinyl type adhesive) is coated on the composite sheet material, and the composite sheet material is adhered to a surface material of a non-woven fabric of plastic fiber such as polyester fiber, a paper, a pulp and the like or a wooden part or member of an article by heating and pressing it together with the surface material or the wooden part or member.

The additive mainly consists of polypropylene modified by maleic anhydride, as described above. This additive is solved into the olefinic plastic of the composite sheet material and serves to improve the adhesive property to the wood cellulosic filler, so that the stiffness and the thermal resisting property (the thermal deformation temperature) are improved. Therefore, while, as described above, the composite sheet material is adhered to the surface material or the wooden member by use of an adhesive, the additive also serves to get intimate the adhesive with the composite sheet material.

In addition, while the composite sheet material according to the present invention is softened and is pressed together with the surface material or the wooden part or member of an article so as to weld it to the surface material or the like, the additive serves to improve the affinity between the olefinic plastic and the surface material or the like so as to improve the bond strength.

BEST MODE FOR CARRYING OUT THE INVENTION

An olefinic plastic/wood cellulosic filler composite sheet material according to the present invention is made. Firstly, a granular olefinic plastic and a wood cellulosic filler crushed or pulverized in a predetermined size are provided. Then, a mixture of the wood cellulosic filler, the olefinic plastic and an additive mainly consisting of polypropylene modified by maleic anhydride or its derivative is provided. A little amount of inorganic material such as mica can be added to this mixture as occasion demands. This mixture is provided by mixing those materials in a mixer such as a conventional hensel mixer for a predetermined period and is then transferred to a hopper. Then, the mixture is extruded in a predetermined thickness by use of an extruder, and thereby the composite sheet material is made.

The scope of the olefinic plastic usable herein is not specified, but the olefinic plastic may be selected from straight chain plastics generally used for extrusion molding, such as homopolymer, copolymer and its modification or derivative.

The wood cellulosic filler used herein is produced by crushing or pulverizing a wood or lumber, a hardboard, a pulp or a material mainly consisting of at least two of those and is preferably dried so as not to exceed 5% of the water content. More preferably, the water content is less than 3%. It is desirable that the size thereof is nominally 40–50 mesh if the composite sheet material is sanded or rubbed with a sand paper to adhere with a surface material of a non-woven fabric of polyester fiber and the like, a paper, a pulp or the like or the wooden member by use of an adhesive.

If a wood cellulosic filler crushed or pulverized in such a size is used, its apparent volume occupied in this composite sheet material becomes larger. Thus, the frictional heating produced during the sanding process is reduced, and the sanding process is easily carried out. Also, the size of microscopic chips or waste produced during the sanding process becomes larger. In addition, the apparent adhesive coating area of the wood cellulosic filler exposed on the surface of the composite sheet material becomes larger so as to improve the adhesive property (the bond strength). Meanwhile, if the size of the wood cellulosic filler is larger than that size, the sanding ability and the adhesive property will be improved. However, such large wooden particles are appeared on a surface of the extruded composite sheet material, and this makes worse the outline of the composite sheet material and reduces its flatness and smoothness considerably. This influences the surface material and the wooden member.

If the composite sheet material according to the present invention is welded to the surface material or the wooden member, the sanding process and the adhesive coating process are eliminated, and thus, it is not necessary to consider the size of a wood cellulosic filler. Note that there are no considerable differences in the bonding abilities achieved by use of the fillers between about 40 to 110 mesh (this size of a wood cellulosic filler is usually used).

It is well known that polypropylene modified by maleic anhydride of the additive is compatible to inactive olefinic plastic and serves to improve the adhesive property and the dispersibility of inorganic filler such as talc, calcium carbonate and glass fiber. Meanwhile, it has not been found to achieve such an effect by use of organic filler such as wood powder (wood cellulosic filler). However, it has found that if the water content of the wood cellulosic filler is less than 5%, preferably less than 3% as described in Japanese Patent Application No. Heisei 9-16024 (the same applicant as the present patent application), an effect equivalent to or better than that of inorganic filler described above can be achieved.

That is, even if the volume percent of polypropylene modified by maleic anhydride described above is large and microscopic particles in a wood cellulosic filler of wood powder easy to contain air are used, this wood cellulosic filler is well dispersed in a high melt viscosity of the olefinic plastic and a certain measure of polarity is given if the water content is less than 5%. Therefore, the high affinity of the wood cellulosic filler and the olefinic plastic is achieved so as to improve the adhesive property and the physical property such as hardness, stiffness and thermal resisting property (thermal deformation temperature).

The molecular weight of polypropylene modified by maleic anhydride is less than 50000, preferably less than 20000, more preferably less than 17000. The melt viscosity is less than 17000 cps at 160° C., preferably less than 8000 cps at 160° C. It is desirable that the acid number is 20 mgKOH/g.

Table 1 shows the physical property of wood cellulosic filler/olefinic plastic composite sheet materials with or without polypropylene modified by maleic anhydride. As shown in Table 1, if the water content of the wood cellulosic filler is less than 5%, polypropylene modified by maleic anhydride serves to improve the physical property.

TABLE 1

| PHYSICAL PROPERTY OF COMPOSITE SHEET MATERIAL CONTAINING WOOD CELLULOSIC FILLER[1] | | | |
|---|---|---|---|
| Additive (polypropylene modified by maleic anhydride)[2] (parts by weight) | none | 1 | 1 |
| Water content (%) of wood powder | 3–5 | 3–5 | 8 |
| Tensile strength (Kg/mm$^2$) | 3.35 | 3.27 | 3.17 |
| Bending strength (kg/mm$^2$) | 4.54 | 5.85 | 4.61 |
| Bending elasticity (kg/mm$^2$) | 415 | 486 | 425 |
| Impact strength (Kgmm/mm$^2$) (Charpy notch) | 2.92 | 3.38 | 3.01 |
| Thermal deformation temperature (° C.) (18.5 Kg/mm$^2$) | 105 | 116 | 108 |

[1]polypropylene: 50 parts by weight/wood powder: 50 parts by weight
[2]YUMEX 1010 (trade name) (SANYO KASEI, Co., Ltd.)

If the amount of mica added when molding this composite sheet material is 3–8 parts by weight (preferably 4–6 parts by weight) and mica has larger size (40–50 mesh) than the normal size, not only the thermal resisting property of the resulting composite sheet material according to the present invention is improved but also the hardness of the surface thereof can be slightly higher and chips or waste produced during the sanding process are dry and smooth so that the chips or waste which causes to blind a sanding machine during the sanding process can be easily removed by means of air blowing. Preferably, the weight average flake size of mica is 100–300 µm and its aspect ratio is 50–75. More preferably, the weight average flake size is 100–280 µm and its aspect ratio is 60–70.

Since the thermal resisting property of a wood cellulosic filler/olefinic plastic composite sheet material according to the present invention is improved as shown in Table 1, even though the temperature of the composite sheet material is slightly risen by the frictional heating caused by the sanding process, the softening of chips or waste produced during the sanding process is very small. Thus, the chips or waste attached to the sanding machine can be easily removed by means of air blowing, and this makes the sanding operation much easier.

In addition, as described above, while the olefinic plastic exhibits no polarity, polypropylene modified by maleic anhydride mixed in a wood cellulosic filler/olefinic plastic composite sheet material of the present invention serves to give a certain measure of polarity for the olefinic plastic, and as a result, it is improved to get intimate the olefinic plastic with an adhesive and to increase the bond strength between the composite sheet material and the surface material or the wooden part or member. Such an effect can be achieved by use of a water-soluble or non-water-soluble adhesive.

According to a manner as described above, a product having a good bond strength can be produced by welding a wood cellulosic filler/olefinic plastic composite sheet material of the present invention to the surface material or the wooden member. That is, the composite sheet material is heated into a half-melt condition, and then, this composite sheet material is put on the surface material or the wooden member and is pressed together therewith. In this case, as well as the above case, since a certain measure of polarity is given for the olefinic plastic of the half-molten composite sheet material, the affinity of this olefinic plastic to a wooden member or a surface material heated up to 60–120° C. is increased, so that the half-molten olefinic plastic comes into gaps formed between very small fellow wood celluloses or formed between fibers of a non-woven fabric so as to achieve a very high bond strength. Thus, a hot melt material necessary to achieve a good result in the hot water resisting test is not necessary.

Table 2 shows a result of the bonding test of a wood cellulosic filler/olefinic plastic composite sheet material of the present invention and a variety of test materials such as a non-woven fabric of polyester fiber, a recycled paper and a plywood (5 layers).

TABLE 2

BONDING TEST OF COMPOSITE SHEET MATERIAL CONTAINING WOOD CELLULOSIC FILLER

| TEST MATERIAL | NONWOVEN FABRIC OF POLYESTER FIBER | | RE-CYCLED PAPER | | PLYWOOD (5 LAYERS) | |
|---|---|---|---|---|---|---|
| COMPOSITE SHEET MATERIAL CONTAINING WOOD CELLULOSIC FILLER | INVEN-TION | PRIOR ART | INVEN-TION | PRIOR ART | INVEN-TION | PRIOR ART |
| BOND STRENGTH[4] (Kg/cm$^2$) WELDING ROLL/PRESS | | | | | | |
| NORMAL CONDITION[2] | 10< | 10< | 10< | 10< | — | — |
| AFTR DIPPING IN | ⊚ | X | ⊚ | X | — | — |
| HOT WATER[3] | (8.8–9.4) | (SEPARATION) | (9.5–10.5) | (SEPARATION) | — | — |
| PRESS AFTER REHEATING (180–190° C.) | | | | | | |
| NORMAL CONDITION[2] | 10< | 10< | — | — | 10< | 10< |
| AFTR DIPPING IN | ⊚ | X | — | — | ⊚ | X |
| HOT WATER[3] | (9.0–9.6) | (SEPARATION) | — | — | (8.8–9.8) | (SEPARATION) |
| ADHESIVE BONDING ADHESIVE COATING AFTER SANDING | | | | | | |
| NORMAL CONDITION[2] | — | — | — | — | 10< | 10< |
| AFTR DIPPING IN | — | — | — | — | ⊚ | X |
| HOT WATER[3] | — | — | — | — | (8.8–9.6) | (SEPARATION) |

NOTE
1: 50–80 g/m$^2$
2: The bond strength (kg/cm$^2$) at a normal temperature.
3: Presence of a relief after drying and heating at 60 ± 3° C. for 2 hours after dipping in 70 ± 3 ° C. water for 3 hours
4: The size of specimen: 75 × 75 mm
In order to measure each bond strength after the welding or the adhesive bonding of the composite sheet material and each test material, 2 liquid type urethane adhesive is coated on a surface of the test material surface (without a combination of the composite sheet material and the plywood) and the plywood (5 layers) is bonded with it. Then, the tensile strength and the relief or separation after dipping it in hot water and heating and drying it is observed.

As seen in Table 2, each tensile strength obtained by the roll/press welding of a wood cellulosic filler composite sheet material and each test material (a non-woven fabric of a polyester fiber and a recycled paper) according to the present invention is better than that of the art. Also, the hot water resisting property is not obtained according to the art but is obtained according to the present invention. Moreover, the tensile strength obtained by the adhesive bonding of a wood cellulosic filler composite sheet material and a test material (a plywood) according to the present invention is better than that of the art. Also, the hot water resisting property is not obtained according to the art but is obtained according to the present invention.

As described above, even though the frictional heating is produced when a sanding process as a pre-treatment required if a wood cellulosic filler/olefinic plastic composite sheet material according to the present invention adhered to a variety of surface materials such as a non-woven fabric of a plastic fiber such as a polyester fiber, a paper, a pulp and the like or a variety of wooden parts or members of an article, the softening thereof is not so high and chips and waste produced during the sanding process is dry and smooth. Thus, even though chips or waste produced during the sanding process blinds the sanding machine, the chips or waste can be easily removed by means of air blowing. Therefore, the efficiency of the sanding process is high and the bond strength to this composite sheet material becomes stable.

Alternatively, without use of such an adhesive, a wood cellulosic filler/olefinic plastic composite material according to the present invention can weld with the surface material or the wooden part or member of an article. Then, a product having a layered structure obtained by laminating or integrating those materials can be produced. In this case, such a product can be produced by merely heating the composite sheet material into a half-melt condition, putting it on the surface material or the wooden part or member and pressing it therewith, without using any welding or hot melt materials used in the art. Note that the affinity of an olefinic plastic of this composite sheet material and the hot surface material or the wooden part or member is increased, so that the good bonding ability at a normal condition and the good bond strength (i.e. it can tolerate a very hard hot water resisting test and has a stable strength) can be obtained.

Since a sanding process necessary to the adhesive bonding is eliminated in the welding, it becomes unnecessary to remove microscopic chips or waste produced during the sanding process. Also, an environmental problem caused by such microscopic chips or waste produced in a workshop is advantageously vanished.

As described above, in not only the adhesive bonding but also the welding, a wood cellulosic filler/olefinic plastic composite sheet material according to the present invention can ease to obtain a good and stable bond strength which can not be obtained by use of an olefinic plastic composite sheet material containing much quantity of a wood cellulosic filler according to the art.

What is claimed is:

1. A bondable wood cellulosic filler/olefinic plastic composite sheet material made by extruding in a sheet shape a mixture consisting of:
   (1) 40–60 parts by weight of an olefinic plastic:
   (2) 60–40 parts by weight of a wood cellulosic filler, the size thereof being 40–110 mesh and the water content thereof being not exceeding 5%,
   (3) 0.5–5.0 parts by weight of an additive mainly consisting of polypropylene modified by maleic anhydride or its derivative; and optionally
   (4) 3–8 parts by weight mica.

2. A bondable wood cellulosic filler/olefinic plastic composite sheet material of claim 1 wherein the amount of said additive is 1.0–3.0 parts by weight.

3. A bondable wood cellulosic filler/olefinic plastic composite sheet material of claim 1 wherein said wood cellulosic filler is produced by crushing or pulverizing in a predetermined size a material selected from the group consisting of a wood, a hardboard, a pulp and a material mainly consisting of at least two of those.

4. A bondable wood cellulosic filler/olefinic plastic composite sheet material of claim 1 wherein said polypropylene modified by maleic anhydride is highly modified by maleic anhydride and the molecular weight thereof is low, and said additive mainly consists of this polypropylene modified by maleic anhydride or its derivative.

5. A bondable wood cellulosic filler/olefinic plastic composite sheet material of claim 1 wherein the molecular weight of said additive is less than 50000.

6. A bondable wood cellulosic filler/olefinic plastic composite sheet material of claim 1 wherein the molecular weight of said additive is less than 20000.

7. A bondable wood cellulosic filler/olefinic plastic composite sheet material of claim 1 wherein the molecular weight of said additive is less than 17000.

8. A bondable wood cellulosic filler/olefinic plastic composite sheet material of claim 1 wherein the melt viscosity of said additive is less than 17000 cps at 160° C.

9. A bondable wood cellulosic filler/olefinic plastic composite sheet material of claim 1 wherein the melt viscosity of said additive is less than 8000 cps at 160° C.

10. A bondable wood cellulosic filler/olefinic plastic composite sheet material of claim 1 wherein the acid number of said additive is more than 20 mgKOH/g.

11. A bondable wood cellulosic filler/olefinic plastic composite sheet material of claim 1 wherein if a surface of the bondable wood cellulosic filler/olefinic plastic composite sheet material is sanded to adhere and bond by use of an adhesive, the size of said wood cellulosic filler is 40–50 mesh, and mica is further added, the amount of said mica added being 4–6 parts by weight and the weight average flake size of said mica being 100–300 $\mu$m and the aspect ratio thereof being 50–75.

12. A bondable wood cellulosic filler/olefinic plastic composite sheet material of claim 11 wherein the amount of said mica added is 4–6 parts by weight, the weight average flake size Thereof is 100–280 $\mu$m and the aspect ratio is 60–70.

13. A composite sheet comprising:
   (1) 40–60 parts by weight of an olefinic plastic;
   (2) 60–40 parts by weight of a wood cellulosic filler, where the wood cellulosic filler is 40–110 mesh and the water content of the wood cellulosic filler does not exceed 5%; and
   (3) 0.5–5.0 parts by weight of polypropylene modified by maleic anhydride or its derivative.

14. The composite sheet of claim 12, where the water content of the wood cellulosic filler does not exceed 3%.

15. The composite sheet of claim 12, where the composite further comprises 3–8 parts by weight of mica having a weight average flake size of 100–300 $\mu$m and an aspect ratio of 50–75.

16. The composite sheet of claim 12, where the wood cellulosic filler is 40–50 mesh.

17. The composite sheet of claim 12, where the composite sheet comprises 1.0–3.0 parts by weight of the polypropylene modified by maleic anhydride or its derivative.

* * * * *